United States Patent
Takahashi et al.

(10) Patent No.: US 10,679,388 B2
(45) Date of Patent: Jun. 9, 2020

(54) IMAGE PROCESSING APPARATUS, DEVICE CONTROL SYSTEM, IMAGING APPARATUS, AND RECORDING MEDIUM

(71) Applicant: RICOH COMPANY, LTD., Tokyo (JP)

(72) Inventors: Sadao Takahashi, Tokyo (JP); Hiroyoshi Sekiguchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 31 days.

(21) Appl. No.: 16/127,934

(22) Filed: Sep. 11, 2018

(65) Prior Publication Data

US 2019/0005691 A1  Jan. 3, 2019

Related U.S. Application Data

(63) Continuation of application No. PCT/JP2017/003445, filed on Jan. 31, 2017.

(30) Foreign Application Priority Data

Mar. 14, 2016 (JP) ................................. 2016-049795

(51) Int. Cl.
*H04N 7/18* (2006.01)
*G06T 11/20* (2006.01)
(Continued)

(52) U.S. Cl.
CPC ........ *G06T 11/203* (2013.01); *G06K 9/00805* (2013.01); *G06K 9/00825* (2013.01);
(Continued)

(58) Field of Classification Search
CPC .......... G06K 9/00805; G06K 9/00825; G06K 9/3233; G06K 9/4647; G06T 11/203
(Continued)

(56) References Cited

U.S. PATENT DOCUMENTS

| 7,787,712 B2 | 8/2010 | Takahashi et al. |
| 7,982,141 B2 | 7/2011 | Takahashi et al. |

(Continued)

FOREIGN PATENT DOCUMENTS

| JP | 2012-208887 | 10/2012 |
| JP | 5329582 | 10/2013 |

(Continued)

OTHER PUBLICATIONS

Extended European Search Report dated Feb. 14, 2019 in Patent Application No. 17766090.9, 9 pages.
(Continued)

*Primary Examiner* — Gims S Philippe
(74) *Attorney, Agent, or Firm* — Xsensus LLP

(57) ABSTRACT

An image processing apparatus includes processing circuitry configured to generate a map formed of pixels that indicate information including left and right position information, distance information, and frequency values associated with the pixels; detect a pixel block formed of a plurality of the pixels having a common feature amount in the map; and generate a detection frame defining a search target region used for detecting a body from the distance information, based on the information indicated by the pixels forming the detected pixel block.

16 Claims, 14 Drawing Sheets

(51) Int. Cl.
*G08G 1/16* (2006.01)
*G06K 9/46* (2006.01)
*G06K 9/32* (2006.01)
*G06T 7/73* (2017.01)
*G06T 7/13* (2017.01)
*G06K 9/00* (2006.01)

(52) U.S. Cl.
CPC ......... *G06K 9/3233* (2013.01); *G06K 9/4647* (2013.01); *G06T 7/13* (2017.01); *G06T 7/73* (2017.01); *G08G 1/16* (2013.01); *G06T 2207/10028* (2013.01); *G06T 2207/30252* (2013.01); *G06T 2207/30261* (2013.01)

(58) Field of Classification Search
USPC .......................................................... 348/148
See application file for complete search history.

(56) References Cited

U.S. PATENT DOCUMENTS

| | | |
|---|---|---|
| 8,570,334 B2 | 10/2013 | Sekiguchi et al. |
| 8,605,153 B2 | 12/2013 | Sasaki et al. |
| 9,330,320 B2 | 5/2016 | Takahashi et al. |
| 2012/0200705 A1 | 8/2012 | Saigusa et al. |
| 2015/0332103 A1 | 11/2015 | Yokota et al. |
| 2015/0334269 A1 | 11/2015 | Yokota et al. |
| 2015/0358610 A1 | 12/2015 | Takahashi et al. |
| 2016/0014406 A1 | 1/2016 | Takahashi et al. |
| 2016/0019429 A1 | 1/2016 | Ishigaki et al. |
| 2016/0131579 A1 | 5/2016 | Sekiguchi et al. |
| 2017/0124725 A1* | 5/2017 | Sumiyoshi ............ H04N 13/239 |
| 2018/0357495 A1* | 12/2018 | Watanabe .......... G06K 9/00805 |
| 2019/0001910 A1* | 1/2019 | Motohashi .............. B60R 21/00 |
| 2019/0005338 A1* | 1/2019 | Watanabe ................. G06T 7/00 |
| 2019/0014302 A1* | 1/2019 | Watanabe ............... G08G 1/166 |

FOREIGN PATENT DOCUMENTS

| | | |
|---|---|---|
| JP | 2015-11619 A | 1/2015 |
| JP | 5718080 | 5/2015 |
| JP | 2015-207281 | 11/2015 |
| JP | 2016-029557 | 3/2016 |

OTHER PUBLICATIONS

International Search Report dated Apr. 25, 2017 in PCT/JP2017/003445, filed on Jan. 31, 2017 (with English Translation).
Written Opinion issued dated on Apr. 25, 2017 in PCT/JP2017/003445 filed on Jan. 31, 2017.
U.S. Appl. No. 11/526,166, filed Sep. 22, 2006.

* cited by examiner

CAPTURED IMAGE

FINAL FRAME

025# IMAGE PROCESSING APPARATUS, DEVICE CONTROL SYSTEM, IMAGING APPARATUS, AND RECORDING MEDIUM

CROSS-REFERENCE TO RELATED APPLICATION

The present application is a continuation application of International Application No. PCT/JP2017/003445 filed on Jan. 31, 2017, which claims priority to Japanese Patent Application No. 2016-049795 filed on Mar. 14, 2016. The contents of these applications are incorporated herein by reference in their entirety.

BACKGROUND OF THE INVENTION

1. Field of the Invention

The present invention relates to an image processing apparatus, a device control system, an imaging apparatus, an image processing method, and a recording medium.

2. Description of the Related Art

With respect to the safety of automobiles, in the related art, the body structure of automobiles, etc., has been developed from the viewpoint of protecting pedestrians and passengers when colliding with pedestrians and automobiles. Furthermore, in recent years, with the development of the information processing technology and the image processing technology, techniques for detecting people and automobiles, etc., at high speed, have been developed. Techniques of applying the above techniques to automobiles, etc., and automatically applying brakes before collision in order to prevent collision, are already known.

Incidentally, for example, Patent Literature 1 discloses a technique of detecting a body, such as a person and an automobile, etc., approaching a reference vehicle, by using a camera, etc., and surrounding the detected approaching body with a detection frame.

CITATION LIST

Patent Literature

[PTL 1]
Japanese Patent No. 5329582

SUMMARY OF THE INVENTION

An aspect of the present invention provides an image processing apparatus, a device control system, an imaging apparatus, an image processing method, and a recording medium in which one or more of the disadvantages of the related art are reduced.

According to one aspect of the present invention, there is provided an image processing apparatus including processing circuitry configured to generate a map formed of pixels that indicate information including left and right position information, distance information, and frequency values associated with the pixels; detect a pixel block formed of a plurality of the pixels having a common feature amount in the map; and generate a detection frame defining a search target region used for detecting a body from the distance information, based on the information indicated by the pixels forming the detected pixel block.

DETAILED DESCRIPTION OF THE PREFERRED EMBODIMENTS

Figure 1:
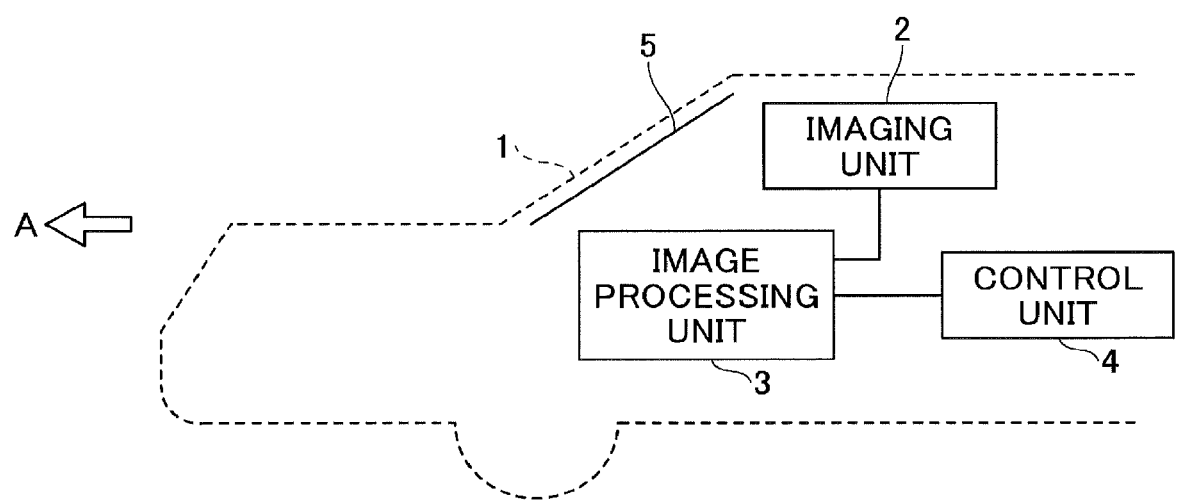
FIG. 1 is a schematic configuration diagram of a device control system according to an embodiment.

A problem to be solved by an embodiment of the present invention is to increase the speed of the process for detecting a body, and reducing the image processing time for surrounding the detected body with a detection frame.

An image processing apparatus according to an embodiment of the present invention will be described below with reference to the drawings. In this description, the image processing apparatus is not limited to the following embodiment, as long as the gist of the present invention is not exceeded. Note that in the drawings, the same or corresponding parts are denoted by the same reference numerals, and redundant descriptions thereof will be simplified or omitted as appropriate. Furthermore, the embodiments described below are the best mode of the present invention and do not limit the scope of the claims according to the present invention.

The image processing apparatus according to an embodiment will be described, by using an example in which the image processing apparatus recognizes a body such as another vehicle travelling in front of the vehicle, captured by an imaging apparatus such as a stereo camera, etc., attached to the vehicle that is a mobile body. Here, the mobile body is not limited to a vehicle, and the present invention may be applied to a ship or an aircraft, etc.

For example, the image processing apparatus uses the result of a process executed by the image processing apparatus to control the travelling, etc., of the vehicle. Note that in addition to the function of controlling the vehicle itself, etc., the control here also includes the function of controlling predetermined devices provided in the vehicle, etc. (for example, devices such as a brake system, a steering system, and an engine control system, etc.).

Furthermore, the image processing apparatus may be configured singly, for example, as an information processing apparatus, etc. Alternatively, the image processing apparatus may be configured such that functions included in the image processing apparatus are integrated with a processing board, etc., included in an imaging apparatus such as a stereo camera.

<Device Control System>

A device control system according to an embodiment will be described with reference to FIG. 1. Here, an outline of the device control system will be described, by taking a vehicle control system for controlling a vehicle, as an example. A direction of an arrow A is the direction in which a vehicle 1 moves forward in FIG. 1. The vehicle 1 includes an imaging unit 2, an image processing unit 3, and a control unit 4. For example, the imaging unit 2 is installed near a rear-view mirror in the interior of the vehicle, and captures images of another vehicle, etc., traveling in front of the vehicle 1, through a windshield 5.

Based on an image captured by the imaging unit 2, the image processing unit 3 that is a body detecting means recognizes a body in front of the vehicle 1. Based on the recognition result from the image processing unit 3, the control unit 4 controls the traveling speed of the vehicle 1, the traveling interval between another vehicle, the traveling lane, and the timing of applying the brakes, etc. Here, the terms imaging unit, image processing unit, and control unit are used as a matter of convenience in the description. That is, the imaging unit, the image processing unit, and the control unit may be referred to as an imaging apparatus (or an imaging means), an image processing apparatus (or an image processing means), and a control apparatus (or a control means), respectively.

<Imaging Apparatus>

Figure 2:
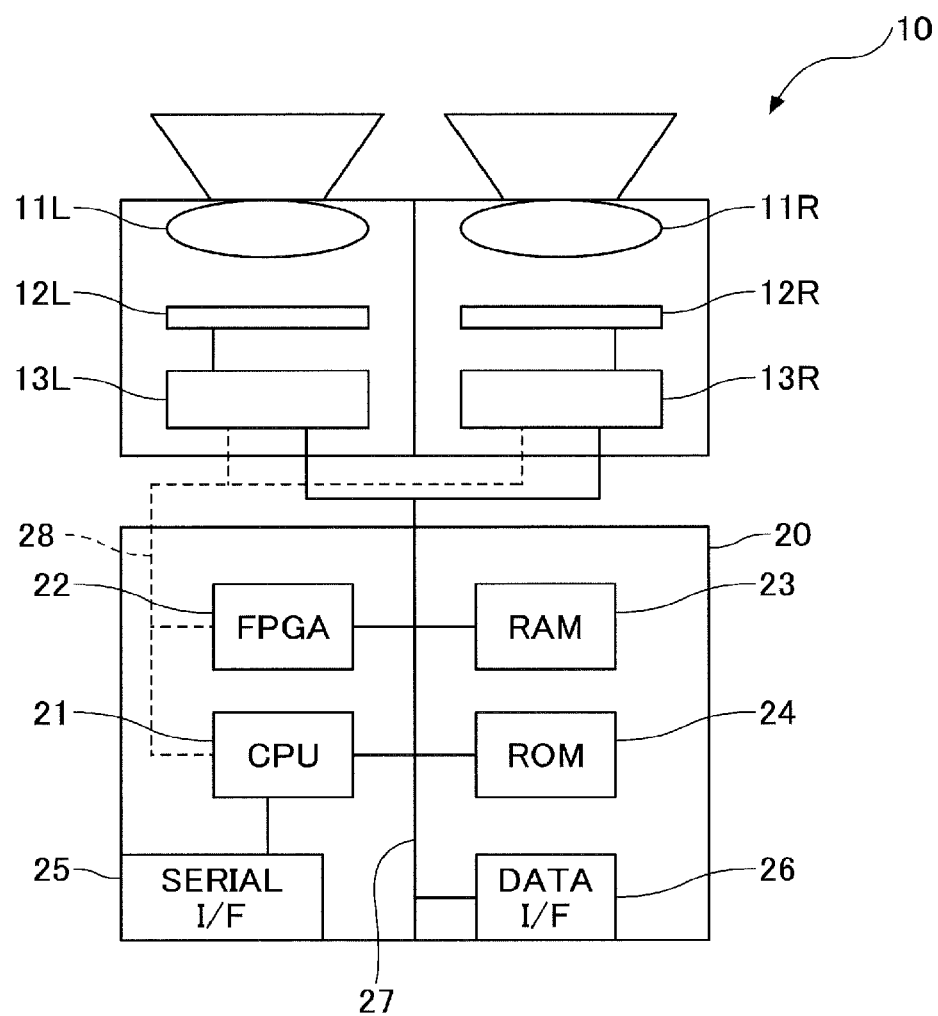
FIG. 2 is a schematic configuration diagram of an imaging apparatus according to an embodiment.

An imaging apparatus according to an embodiment will be described with reference to FIG. 2. The imaging apparatus includes a stereo camera 10 and an image processing board 20.

The stereo camera 10 is formed by assembling two cameras in parallel. The stereo camera 10 includes an image sensor 12L and an image sensor controller 13L corresponding to a left lens 11L, and an image sensor 12R and an image sensor controller 13R corresponding to a right lens 11R. Note that in the present embodiment, the stereo camera 10 is formed of two cameras; however, the stereo camera according to the present invention may be formed of three or more cameras.

The image sensor controllers 13L and 13R respectively have the functions of exposure control of the image sensors 12L and 12R, A/D conversion, image reading control, communication with external circuits, and transmission of image data. The stereo camera 10 is connected to the image processing board 20 via a data bus 27 and a serial bus 28. The stereo camera 10 outputs luminance image data and disparity image data to the image processing board 20.

The luminance image data output from the image sensors 12L and 12R of the stereo camera 10 is transferred to the image processing board 20 via the data bus 27. Furthermore, transmitting and receiving of changes in the sensor exposure control value, changes in the image reading parameter, and of various setting data, are performed from the image processing board 20 via the serial bus 28.

The image processing board 20 includes a central processing unit (CPU) 21, a field-programmable gate array (FPGA) 22, a random access memory (RAM) 23, a read-only memory (ROM) 24, a serial interface (I/F) 25, a data I/F 26, the data bus 27, and the serial bus 28.

The CPU 21 executes operation control of the entire image processing board 20, image processing, and image recognition processing. The FPGA 22 executes processes demanded to be performed in a real-time manner, with respect to the image data stored in the RAM 23. The FPGA 22 executes, for example, gamma correction, distortion correction (that is, parallelization of left and right captured images), and disparity calculation by block matching to generate a disparity image, and stores the data in the RAM 23.

The CPU 21 executes control of the image sensor controllers 13L and 13R of the stereo camera 10 and controlling the entire image processing board 20. Furthermore, the CPU 21 loads programs for executing road surface shape detection, guard rail detection, and object detection from the ROM 24, and executes various processes by inputting a luminance image and a disparity image stored in the RAM 23. Furthermore, the CPU 21 outputs detected data from the serial I/F 25 or the data I/F 26 to the outside.

When executing processes, the CPU 21 uses the data I/F 26 to input vehicle information such as the vehicle speed, the acceleration, the steering angle, and the yaw rate, etc., and uses the information as parameters of various processes such as road surface shape detection. Data to be output to the outside is used as input data for executing vehicle control such as automatic emergency braking and automatic speed control. Note that some of the functions implemented by the CPU 21 and the FPGA 22 may be provided outside the image processing board 20.

<Functional Blocks of Image Processing Apparatus>

Figure 3:
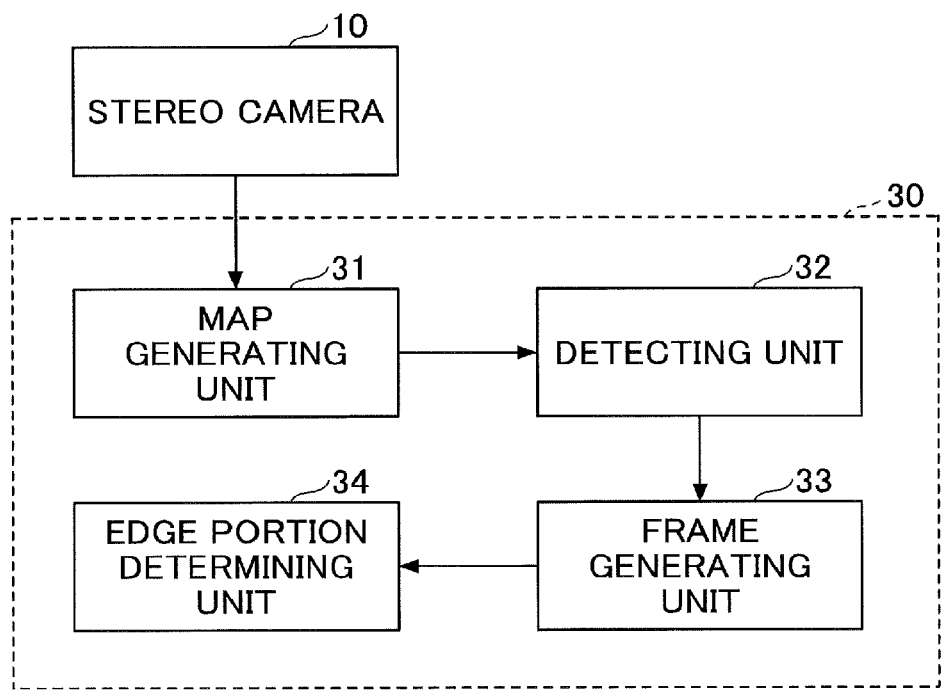
FIG. 3 is a functional block diagram of an image processing apparatus according to an embodiment.

Functional blocks of the image processing apparatus according to an embodiment will be described with reference to FIG. 3. As illustrated in FIG. 3, an image processing apparatus 30 includes a map generating unit 31, a detecting unit 32, a frame generating unit 33, and an edge portion determining unit 34.

First, a procedure performed by the image processing apparatus 30 of generating a disparity image from captured images captured by the stereo camera 10, which includes two cameras that are two imaging units, will be described. This procedure is implemented by the FPGA 22 illustrated in FIG. 2.

More specifically, in order to obtain a disparity image from the luminance image data acquired from the stereo camera 10, the image processing apparatus 30 calculates the disparity value of the corresponding image portions between the captured images captured by the stereo camera 10.

The disparity value referred to here is a value obtained by taking one of the captured images captured by the stereo camera 10 as a reference image and the other one of the captured images as a comparison image, and calculating a positional deviation amount of an image portion in the comparison image with respect to an image portion in the reference image corresponding to the same point in the imaging region, as the disparity value of the image portions. Next, by using the principle of triangulation, it is possible to calculate the distance to the same point in the imaging region corresponding to the image portions, based on this disparity value. Note that the disparity value and the distance value can be handled equivalently, and therefore in the present embodiment, the disparity image is used as an example of the distance image, and the disparity information is used as an example of the distance information.

The stereo camera 10 outputs luminance image data as a captured image. In this case, when the stereo camera 10 is a color camera, color luminance conversion for obtaining a luminance signal (Y) from the RGB signals is performed. For example, the luminance signal is obtained by the following formula [1].

$$Y = 0.3R + 0.59G + 0.11B \qquad \text{formula [1]}$$

Note that the image processing apparatus 30 performs a parallelized image generation process on the luminance image data acquired from the stereo camera 10. In this parallelized image generation process, stereo camera images output from the respective cameras are converted into ideal parallelized stereo camera images, which would be obtained if the two cameras were assembled in a parallel manner, based on the distortion of the optical system of the two cameras forming the stereo camera 10 and the relative positional relationship between the left and right cameras.

After performing the parallelized image generation process in this way, the image processing apparatus 30 performs the disparity image generation process for generating the disparity image data. In the disparity image generation process, first, the luminance image data acquired from one of the two cameras is set as the reference image data, and the luminance image data acquired from the other camera is set as the comparison image data. Then, the image processing apparatus 30 uses these pieces of image data to calculate the disparity of both of these pieces of image data, generates disparity image data, and outputs disparity image data. This disparity image data indicates a disparity image in which pixel values corresponding to disparity values d calculated for the respective image portions in the reference image data, are expressed as pixel values of the respective image portions.

Specifically, the image processing apparatus 30 defines a block formed of a plurality of pixels (for example, 16 pixels×1 pixel) centered on one target pixel for a certain row of the reference image data. On the other hand, in the same row in the comparison image data, a block having the same size as the block defined in the reference image data, is shifted pixel by pixel in the lateral line direction by the image processing apparatus 30. Then, the image processing apparatus 30 calculates a correlation value indicating the correlation between the feature amount indicating the feature of the pixel value of the block defined in the reference image data and the feature amount indicating the feature of the pixel value of each of the blocks in the comparison image data.

Next, based on the calculated correlation values, the image processing apparatus 30 performs a matching process to select a block of the comparison image data having the highest correlation with the block of the reference image data, among the blocks in the comparison image data. Subsequently, the image processing apparatus 30 calculates, as the disparity value d, the positional deviation amount between the target pixel of the block of the reference image data and the corresponding pixel of the block of the comparison image data selected by the matching process. By performing such a process of calculating the disparity value d on the whole area or a specific area of the reference image data, the disparity image data can be obtained.

For example, as the feature amount of the block used for the matching process, the value of each pixel (luminance value) in the block can be used. Furthermore, as the correlation value, for example, the total sum of the absolute values indicating the difference between the value of each pixel (luminance value) in the block of reference image data and the value of each pixel (luminance value) in the block of the comparison image data corresponding to each of the pixels of the reference image data, can be used. In this case, it can be said that the block having the smallest total sum has the highest correlation.

In the case where the matching process in the image processing apparatus 30 is implemented by hardware processing, for example, methods such as Sum of Squared Difference (SSD), Zero-mean Sum of Squared Difference (ZSSD), Sum of Absolute Difference (SAD), and Zero-mean Sum of Absolute Difference (ZSAD), etc., can be used.

Note that in the matching process, only disparity values in units of pixels can be calculated, and therefore if a disparity value of a sub pixel level that is less than one pixel is required, it is necessary to use an estimated value. As an estimation method thereof, for example, an equiangular straight line method and a quadratic curve method, etc., can be used. However, an error occurs in the estimated disparity value at the subpixel level, and therefore estimation error correction (EEC), etc., for reducing this estimation error, may be used.

The map generating unit 31 is a map generating means for generating a map formed of pixels that include left-right coordinate information and distance information and that are associated with frequency values, from a distance image formed of pixels that include position information indicating relative positional relationships between the top, bottom, right, and left positions and that indicate distance information. In the present embodiment, the coordinate information of x, y in the xy coordinate system is described as an example of "position information indicating the relative positional relationships between the top, bottom, right, and left positions". On the other hand, as long as the position information indicates the relative positional relationships between the top, bottom, right, and left positions, the position information is not limited to the coordinate information of x, y. Furthermore, in the present embodiment, the position information indicating the relative positional relationships on the right and left sides of a pixel is referred to as "left and right position information", and the position information indicating the relative positional relationships on the top and bottom sides of the pixel is referred to as "top and bottom position information". The function of the map generating unit 31 is implemented by the CPU 21 illustrated in FIG. 2. The "map" generated by the map generating unit 31 includes a U map and a real U map described later.

The map generating unit 31 generates a V map to generate the U map. Furthermore, the map generating unit 31 generates a real U map from the U map, by converting the x axis direction of the U map into an actual distance. Note that in the present embodiment, it is described that a plurality of maps is created in order from one another; however, the present invention is not limited as such. For example, the real U map may be directly generated from a disparity image obtained by the two imaging means. Furthermore, in the present embodiment, a V map is generated to estimate the position of the road surface in a disparity image, as will be described later. However, another method by which the position of the road surface can be estimated may be used, without relying on a V map.

The V map generation procedure by the map generating unit 31 will be described with reference to FIGS. 4A and 4B. The map generating unit 31 generates a V map based on the generated disparity image. Generation of the V map is performed in order to estimate a road surface position in the disparity image, and recognize a body present on the road surface. By identifying the road surface position, information of the height from the road surface can be obtained, and the size of the body present on the road surface can be identified.

Each piece of disparity pixel data included in the disparity image data is indicated by a set (x, y, d) of the x direction position, the y direction position, and the disparity value d. The map generating unit 31 generates a two-dimensional histogram, by setting d on the X axis, y on the Y axis, and the frequency on the Z axis, among the elements of this set (x, y, d). This two-dimensional histogram corresponds to the V map. That is, the map generating unit 31 counts up the frequency by 1 for each pixel of the disparity image, when (d, y) is held.

Figure 4A:
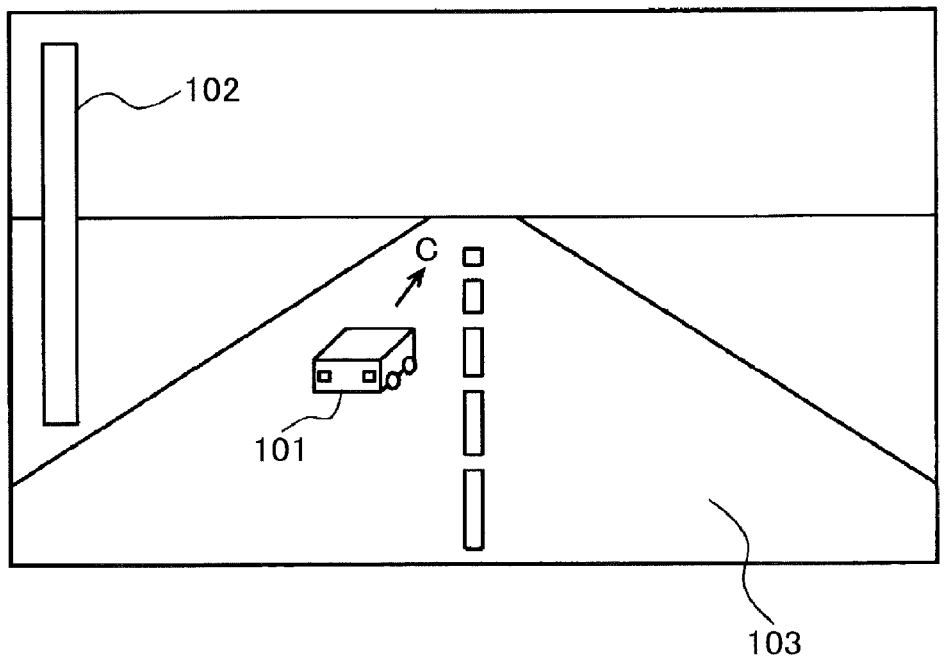
FIG. 4A is a diagram for describing a procedure of generating a V map according to an embodiment.
Figure 4B:
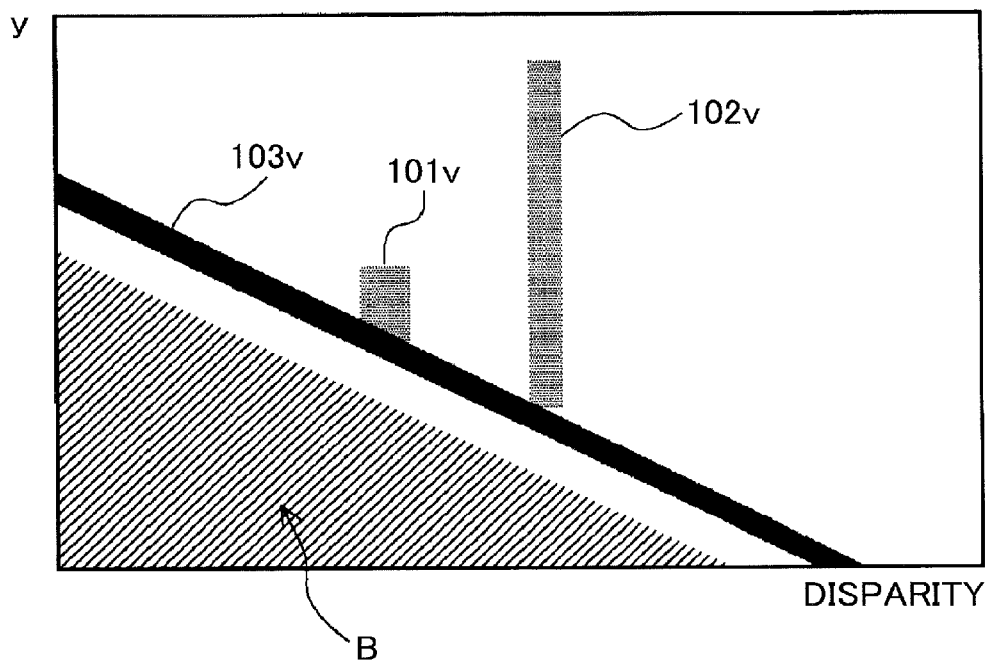
FIG. 4B is a diagram for describing a procedure of generating a V map according to an embodiment.

FIG. 4A is a captured image obtained by capturing a state in which a vehicle 101 is traveling in the direction of the arrow C on a road surface 103, and a utility pole 102 exists on the left side of the road surface 103. A V map generated by the map generating unit 31 based on the captured image of FIG. 4A, is illustrated in FIG. 4B. As illustrated in FIG. 4B, when converting a disparity image into a V map, the disparity values at a certain height from the road surface are clustered in association with each other in the V map, so that a body on the road surface can be recognized. By performing the clustering, it is possible to recognize a vehicle 101v, a utility pole 102v, and a road surface 103v in the V map.

Furthermore, it is necessary to set a region (hereinafter referred to as "voting region") where the disparity values are associated in the V map. In FIG. 4B according to the present embodiment, a region B indicated by slanted lines is a portion below the road surface 103. No disparity is detected in the portion below the road surface 103, and therefore the disparity values are not associated with each other in the B region. Furthermore, it is preferable to determine the voting region in consideration of the changes in the estimated road surface range, etc., depending on the traveling state of the vehicle in which the camera is installed.

Furthermore, the map generating unit 31 performs a road surface shape detecting process for detecting the shape of the road surface 103. This is a process of linearly approximating the position estimated as the road surface in the V map. As a method of linear approximation, for example, a least squares method or Hough transformation may be used. For example, when the road surface is flat, the position can be approximated by one straight line; however, if the gradient changes in the middle of the road, it is necessary to divide the map into sections to accurately perform linear approximation.

Note that when the road surface shape detection process is performed in the V map, the voting region may be restricted as described above, or the road surface shape detection may be performed by dividing the region into two regions, namely a large disparity region and a small disparity region.

The map generating unit 31 performs a road surface height table calculation process of calculating the height of the road surface 103 and tabulating the calculated height. A linear expression representing the road surface is obtained from the V map, and if the disparity d is determined, then the y coordinate at that time is determined. This y coordinate is the height of the road surface, and this is tabulated in the necessary disparity range.

Next, the outline of the U map generation procedure by the map generating unit 31 will be described with reference to FIGS. 5A to 5C. The map generating unit 31 generates a U map to estimate the existence of, for example, a guardrail or a standing wall, etc., along a road surface. The map generating unit 31 sets the set (x, y, d) of the x direction position, the y direction position, and the disparity value d in each piece of disparity pixel data included in the disparity image data, such that x is set on the X axis, d is set on the Y axis, and the frequency is set on the Z axis, to generate two-dimensional histogram information of X-Y. The two-dimensional histogram information is the U map.

In the present embodiment, the map generating unit 31 generates a frequency U map with respect to points (x, y, d) in the disparity image in a range of a predetermined height from the road surface (for example, 20 cm to 3 m), based on the height of each road surface portion tabulated in the road surface height table described above.

Figure 5A:
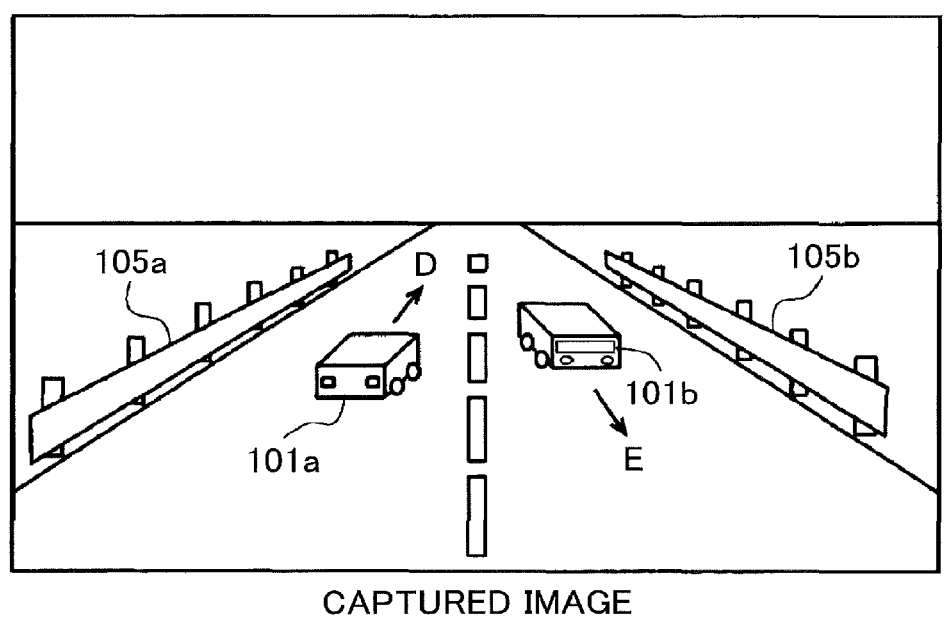
FIG. 5A is a diagram for describing a procedure for generating a U map according to an embodiment.

FIG. 5A is a captured image of a state in which a vehicle 101*a* travels in the direction of the arrow D on the left lane, and a vehicle 101*b* travels in the direction of the arrow E on the right lane, on a road having one lane on each side. Furthermore, guard rails 105*a* and 105*b* are set on both sides of the road.

Figure 5B:
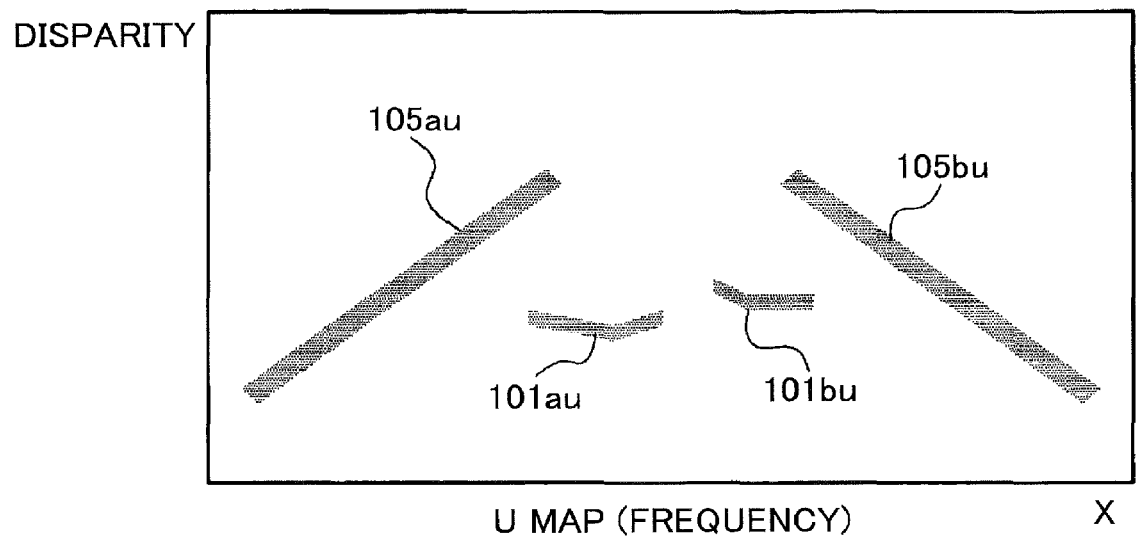
FIG. 5B is a diagram for describing a procedure of generating a U map according to an embodiment.

FIG. 5B is a diagram illustrating a frequency U map converted from the captured image illustrated in FIG. 5A. The guard rails 105*a* and 105*b* are the straight lines extending from the left and right ends to the center upper part. Here, the guard rails 105*a* and 105*b* after the U map conversion are denoted as 105*au* and 105*bu*, respectively.

On the other hand, the vehicle 101*a* and the vehicle 101*b* have a shape including a horizontal line segment and an oblique line connected to the horizontal line segment when the side of the car is visible and disparity is detected, between the guard rails 105*au* and 105*bu*. Here, the vehicles 101*a* and 101*b* after the U map conversion are denoted as 101*au* and 101*bu*, respectively.

Figure 5C:
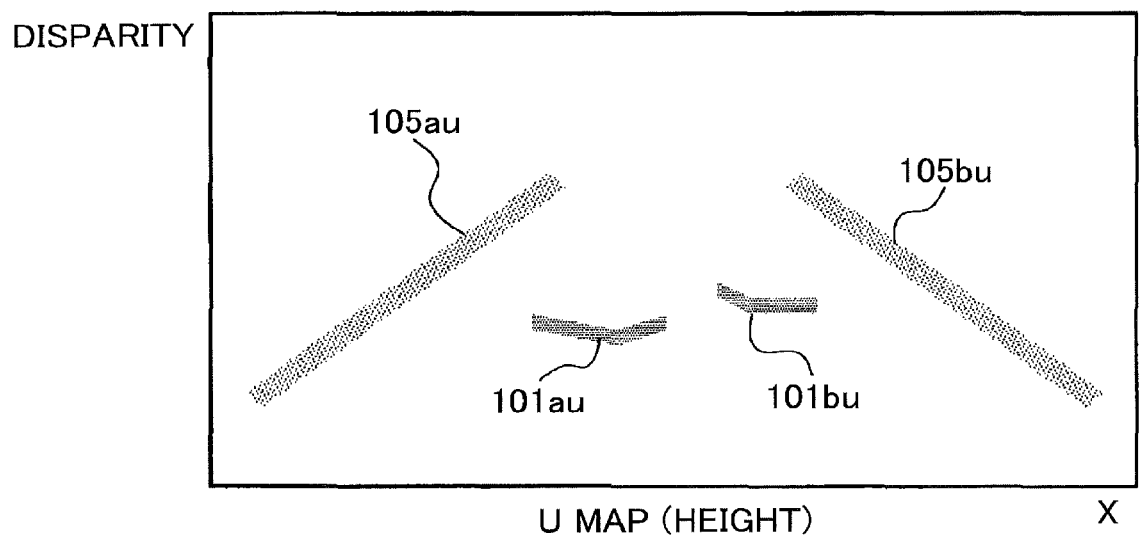
FIG. 5C is a diagram for describing a procedure of generating a U map according to an embodiment.

FIG. 5C is a diagram illustrating a height U map. The map generating unit 31 generates a height U map simultaneously with the generation of the frequency U map. The map generating unit 31 sets the set (x, y, d) of the x direction position, the y direction position, and the disparity value d, in each piece of disparity pixel data included in the disparity image data, such that x is set on the X axis, d is set on the Y axis, and the height from the road surface is set on the Z axis, to generate two-dimensional histogram information of X-Y. The two-dimensional histogram information is the height U map. The value of the height from the road surface at this time is the maximum value.

In FIG. 5C, as indicated by the difference in darkness of the hatching, the hatching of the vehicles 101*au* and 101*bu* is darker than that of the guard rails 105*au* and 105*bu*, and the height of the vehicles 101*au* and 101*bu* is higher than the height of the guard rails 105*au* and 105*bu*. Accordingly, the height information of a body can be used for body recognition.

Figure 6A:
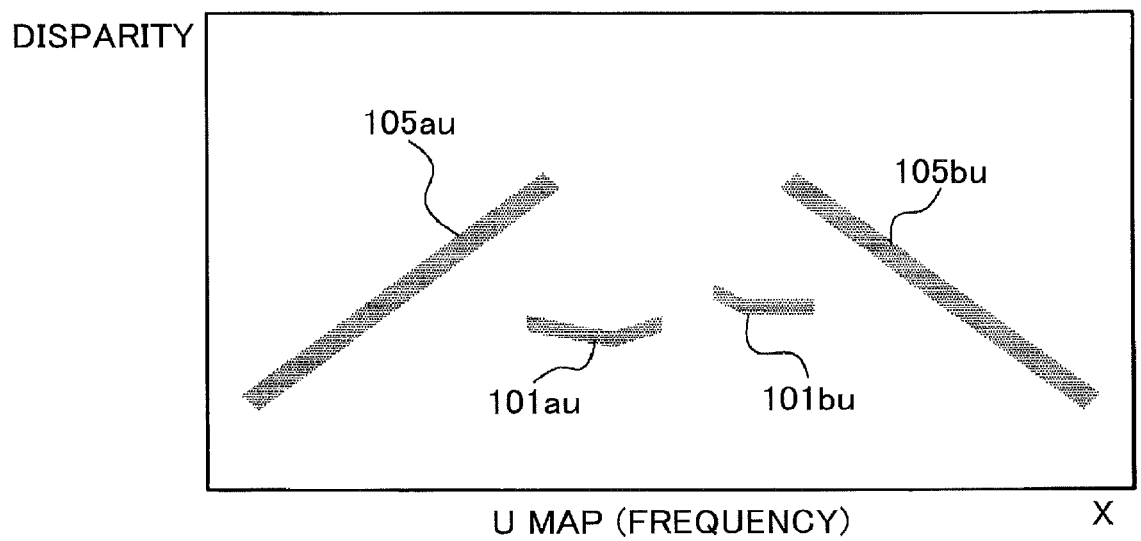
FIG. 6A is a diagram for describing a procedure of generating a real U map according to an embodiment.

The map generating unit 31 generates a real U map obtained by converting the x axis direction of the U map into an actual distance. The real U map generation procedure will be described with reference to FIGS. 6A and 6B. The real U map is obtained by converting the lateral axis of the U map described above from the pixel unit of the image to an actual distance unit, and converting the disparity value on the vertical axis into a thinned disparity to which a thinning rate according to the distance is applied. Note that FIG. 6A is the same as FIG. 5B. Here, an example in which the lateral axis is converted to an actual distance is illustrated; however, it will be sufficient to convert the lateral axis to a unit corresponding to the actual distance.

The thinned disparity on the vertical axis is not thinned with respect to a long distance (here, 50 m or more), but is thinned to ½ with respect to a medium distance (20 m or more, less than 50 m), thinned to ⅓ with respect to a short distance (10 m or more, less than 20 m), and thinned to ⅛ with respect to a very close range (less than 10 m).

That is, the larger the distance, the smaller the amount of thinning. The reason is that a body appears small in size at a faraway location, and therefore there is less disparity data, and the distance resolution is also low, and accordingly, the thinning is reduced. Conversely, the body appears large in size at a short distance, and therefore there is more disparity data, and the distance resolution is high, and accordingly, thinning is increased.

Figure 6B:
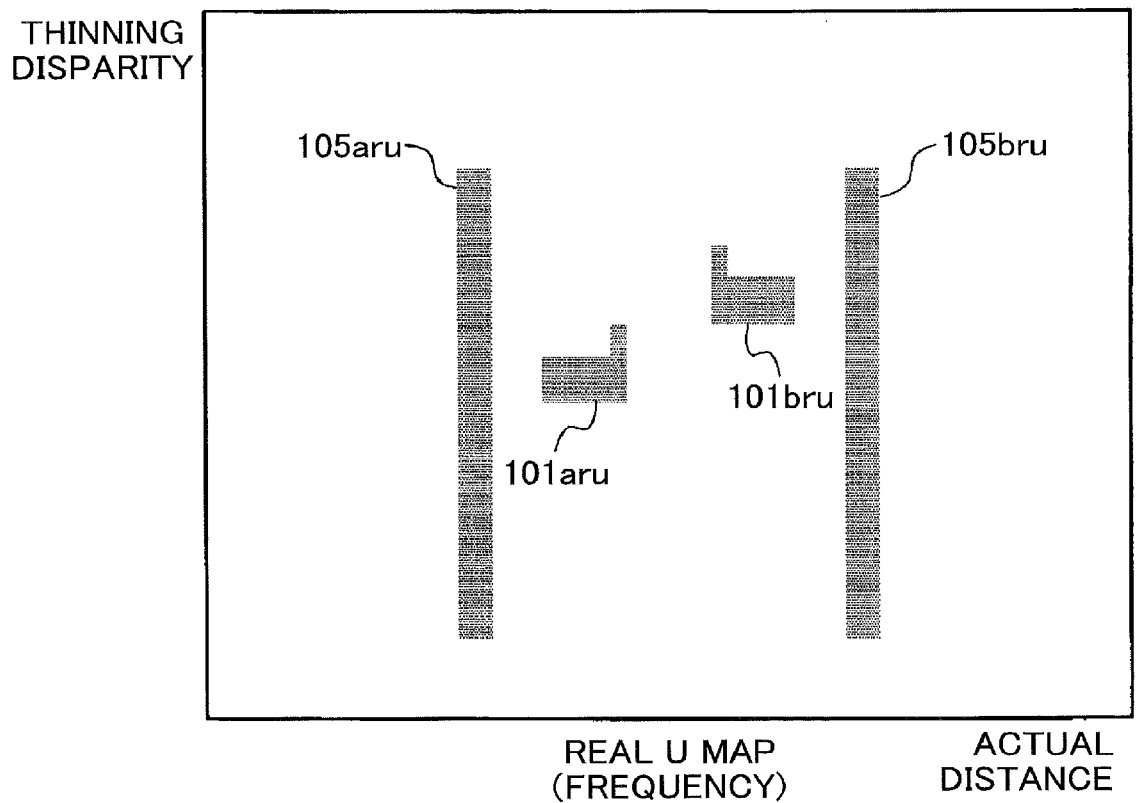
FIG. 6B is a diagram for describing a procedure for generating a real U map according to an embodiment.

FIG. 6B is an example of the real U map generated by the map generating unit 31. The real U map of FIG. 6B is indicated as an overhead view of looking down at the road surface and the vehicles, etc., traveling on the road surface from above. The guard rails 105*au* and 105*bu* are represented by vertical lines, and the guard rails 105*au* and 105*bu* after conversion are denoted by 105*aru* and 105*bru*, respectively. Furthermore, the shapes of the vehicles 101*au* and 101*bu* are also converted to those close to the actual shapes. The vehicles 101*au* and 101*bu* after conversion are denoted by 101*aru* and 101*bru*, respectively.

Note that similar to the height U map of FIG. 5C, not only the frequency map but also the height real U map can be generated for the real U map.

The detecting unit 32 is a detecting means that detects a pixel block formed of a plurality of pixels having a common feature amount, in the U map or the real U map generated by the map generating unit 31. Functions of the detecting unit 32 are implemented by the CPU 21 and the RAM 23, etc., illustrated in FIG. 2. In the present embodiment, the "common feature amount" refers to a case, for example, where the pixels have frequency values that are greater than a predetermined threshold value and the frequency values are approximate to each other. Furthermore, in the present embodiment, a group of pixels in which a plurality of these pixels are connected (or assembled) is defined as a "pixel block". Note that a pixel block may be a pixel having a frequency value that is greater than a predetermined threshold value or a group of such pixels.

The frame generating unit 33 is a frame generating means that generates a detection frame that defines a search target region for detecting a body from the distance image, based on the information indicated by the pixels forming the pixel block detected by the detecting unit 32. The functions of the frame generating unit 33 are implemented by the CPU 21 and the RAM 23, etc., illustrated in FIG. 2. In the present embodiment, "information indicated by a pixel" is, for example, a frequency value and distance information, etc. Furthermore, in the present embodiment, the "detection frame" is a frame defining a search target region used for performing a detection process (to be described later) for identifying the width and the height, etc., of a body corresponding to a pixel block detected by the detecting unit 32 in the U map, etc. Although details will be described later, the detection frame is a frame generated based on information indicated by pixels forming the detected pixel block. In the present embodiment, the detection frame functions as a frame that is provisional (hereinafter referred to as a "provisional frame") in order to identify the width and the height, etc., of a body.

Note that the term "frame" as used herein does not mean a visually recognizable rectangle, but simply means information such as coordinate positions and a width and a height, etc., for identifying a region in the image.

According to the present embodiment, by identifying the width and the height, etc., of a body corresponding to a detection frame generated by the frame generating unit 33, it is unnecessary to access all of the disparity images. As a result, it is possible to increase the speed of the process of detecting a body and to reduce the processing time.

The edge portion determining unit 34 is an edge portion determining means that searches a distance image from the outside toward the center based on the detection frame, and sets a position where the frequency of the distance information is greater than or equal to a predetermined threshold value, as an edge portion of a body. The functions of the edge portion determining unit 34 are implemented by the CPU 21 and the RAM 23, etc., illustrated in FIG. 2. This process is for identifying the width and the height of a body, and details will be described later.

The edge portion determining unit 34 searches a distance image from the left and right towards the center in the x axis direction based on a detection frame, and sets the positions where the frequency of the distance information in the x axis direction is greater than or equal to a predetermined threshold value, as the left and right edges of the body. This is a process for identifying the width of a body, and details will be described later.

The edge portion determining unit 34 searches the distance image from the top and bottom toward the center in the y axis direction based on the detection frame, and determines the positions where the frequency of the distance information in the y axis direction is greater than or equal to a predetermined threshold value, as the top and bottom edges of the body. This is a process for identifying the height of a body, and details will be described later.

The edge portion determining unit 34 preferably sets the search start position of the distance image to be a position away from the outside of the detection frame by a predetermined distance. Furthermore, the edge portion determining unit 34 preferably searches a predetermined range in the y axis direction toward the center in the x axis direction, from the left and right of the distance image based on the detection frame. These processes are for identifying the width and the height, etc., of a body as accurately as possible, and details will be described later.

Furthermore, the edge portion determining unit 34 preferably changes the resolution of the distance image to be the search target, in accordance with the distance information indicated by the pixels forming the pixel block detected by the detecting unit 32. With respect to a body close to the imaging viewpoint, by thinning the pixels and accessing the disparity image, it is possible to increase the processing speed.

<Detection Procedure>

Figure 7A:
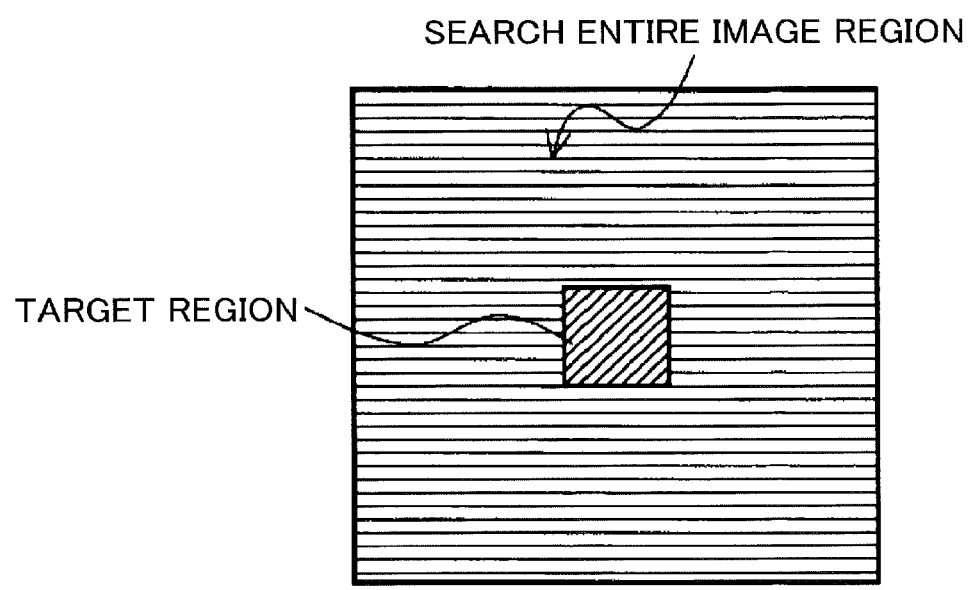
FIG. 7A is a diagram for describing a problem of the related art.
Figure 7B:
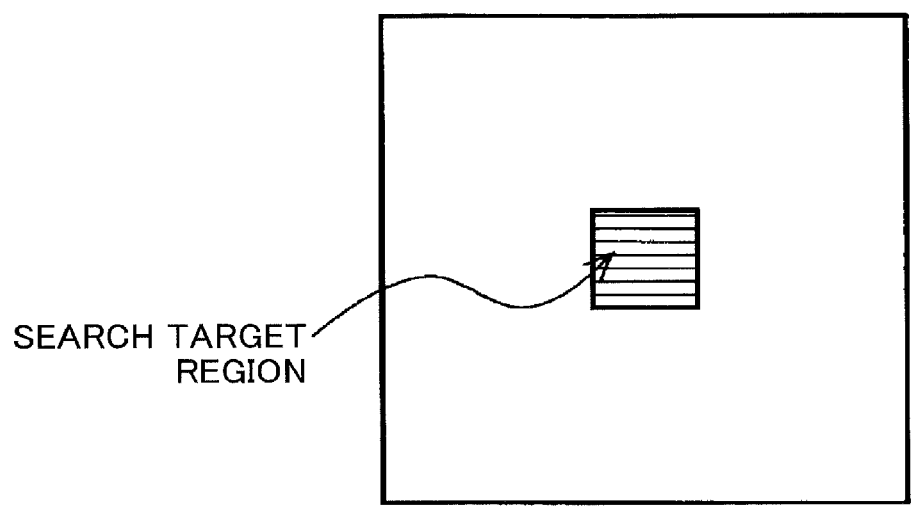
FIG. 7B is a diagram for describing a problem of the related art.
Figure 7C:
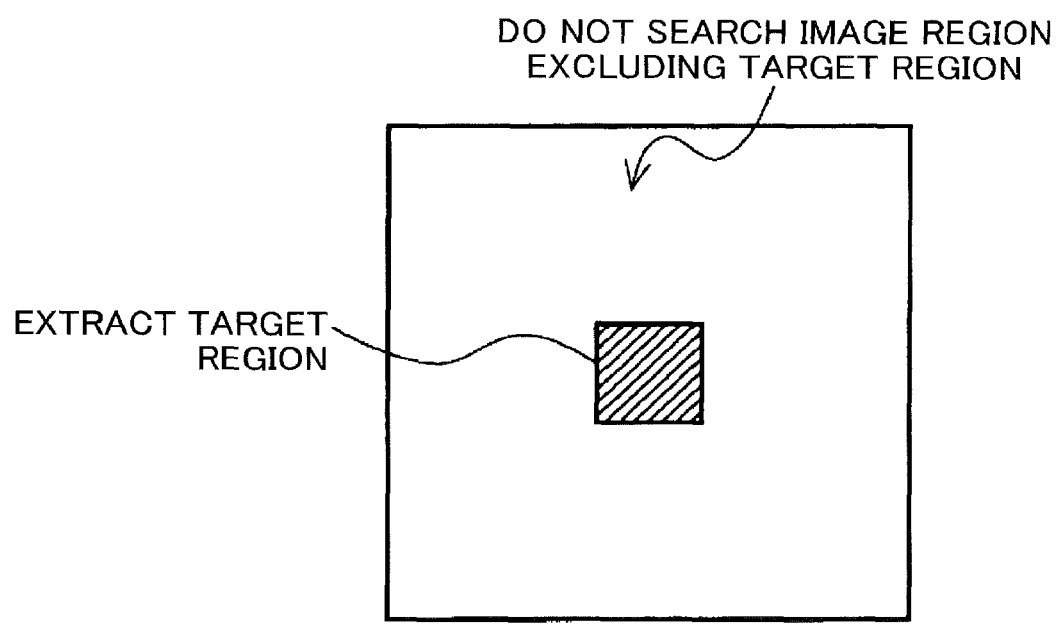
FIG. 7C is a diagram for describing a detection procedure according to an embodiment.
Figure 7D:
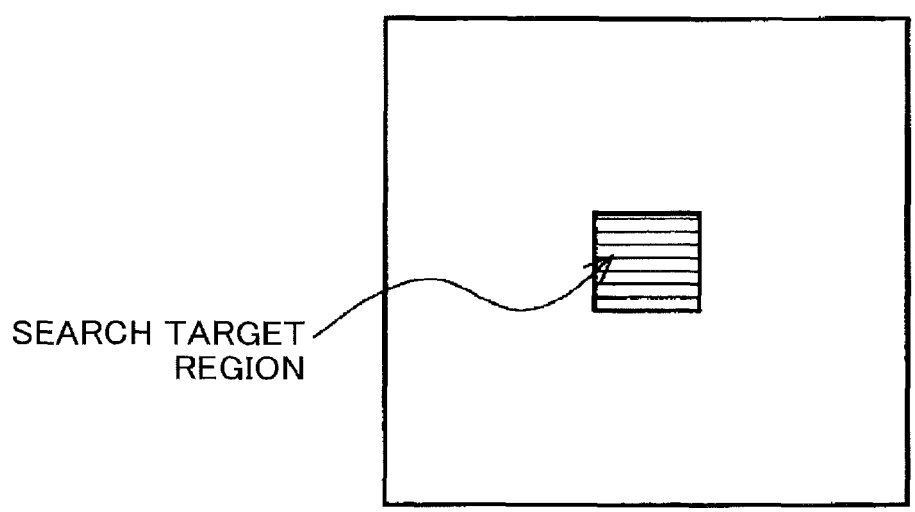
FIG. 7D is a diagram for describing a detection procedure according to an embodiment.

With reference to FIGS. 7C and 7D, a detection procedure according to an embodiment will be described. Here, the detection procedure according to the present embodiment will be described by comparison with the related art (see FIGS. 7A and 7B). In the related art, as illustrated in FIG. 7A, in order to detect a body in a search target region, it has been necessary to access the entire image region (that is, all the pixels) in the disparity image. In the related art, as illustrated in FIG. 7B, in order to identify the width of the body in the search target region detected in this manner, a process of searching or rescanning the search target region has been performed.

On the other hand, in the present embodiment, as illustrated in FIG. 7C, a search target region is extracted based on the detection frame described above, and as illustrated in FIG. 7D, only the search target region is to be searched. According to the present embodiment, there is no need for a process of accessing all of the pixels as in the related art, and therefore it is possible to increase the speed of the body detection process and reduce the processing time.

<Procedure for Generating Detection Frame>

Figure 8A:
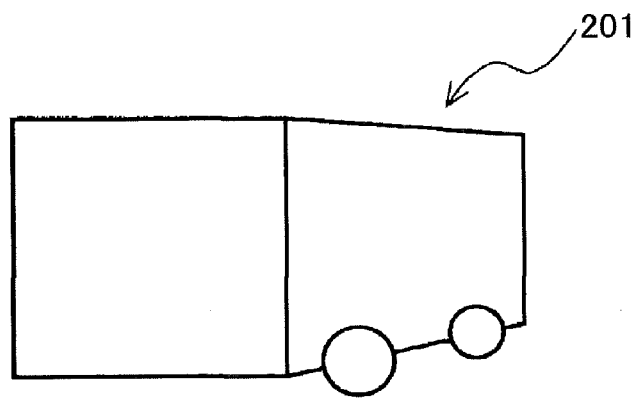
FIG. 8A is a diagram for describing a procedure of generating a detection frame according to an embodiment.
Figure 8B:
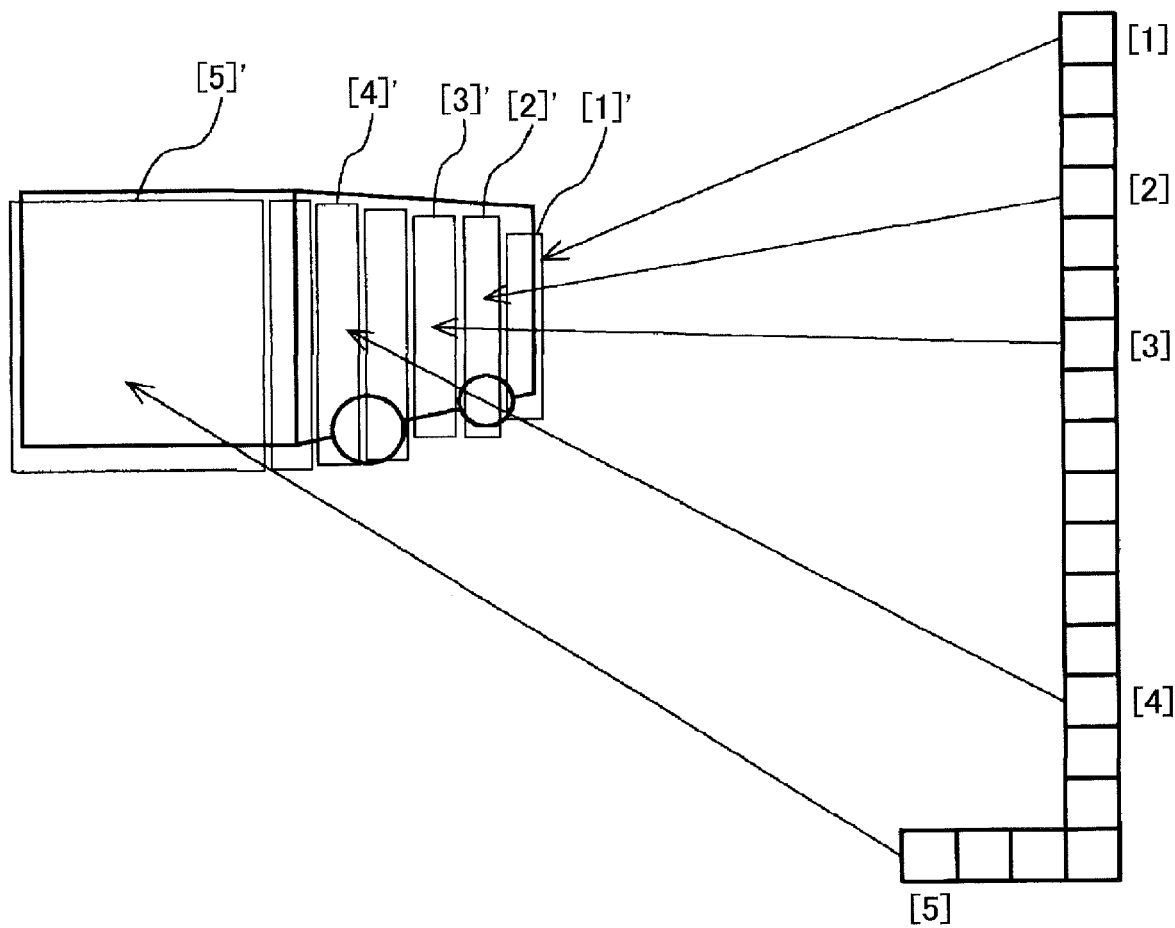
FIG. 8B is a diagram for describing a procedure of generating a detection frame according to an embodiment.
Figure 8C:
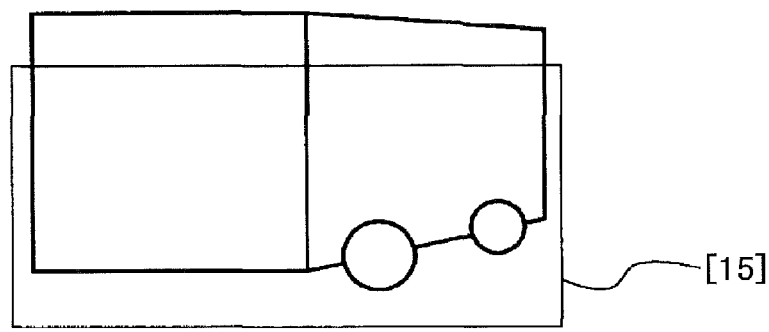
FIG. 8C is a diagram for describing a procedure of generating a detection frame according to an embodiment.
Figure 9:
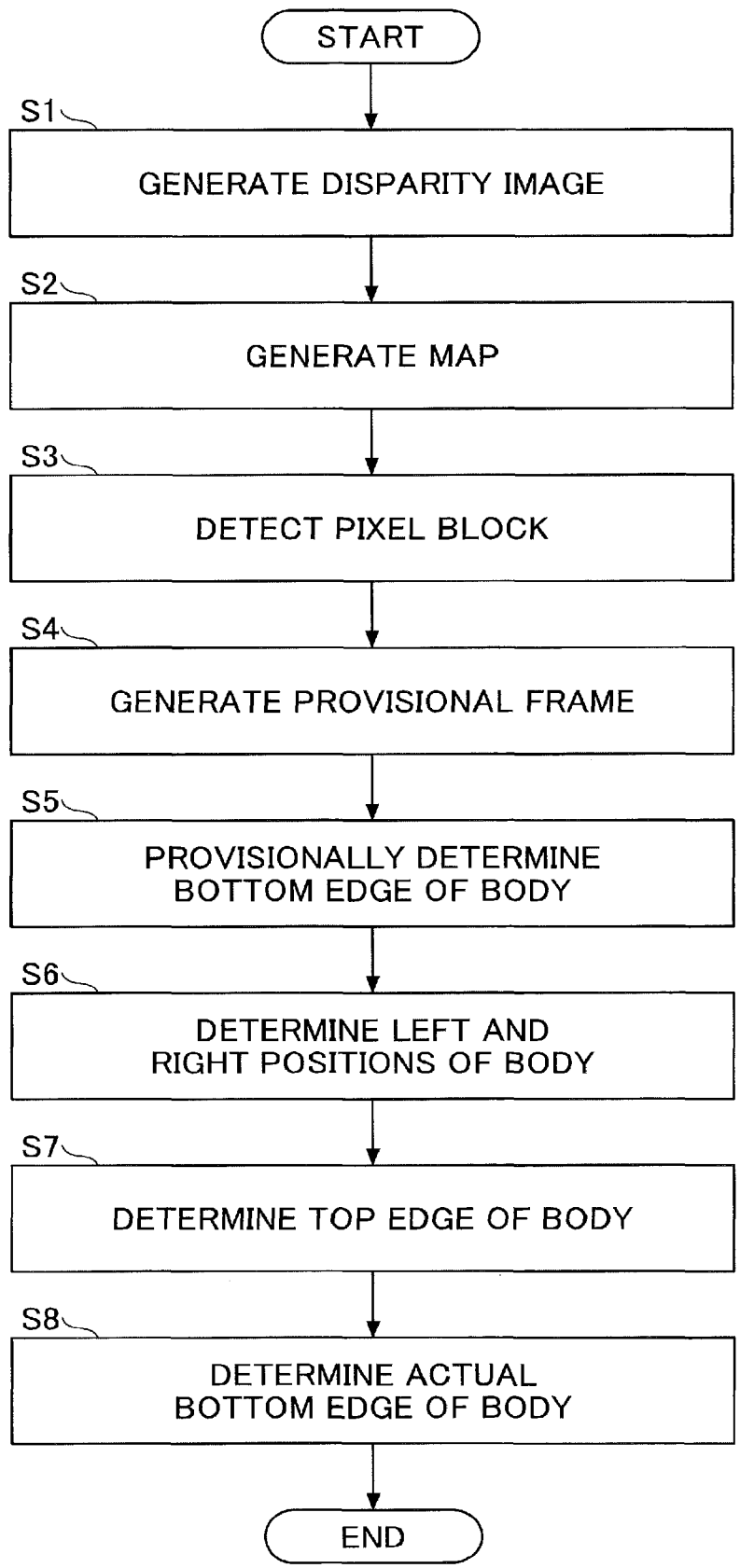
FIG. 9 is a flowchart for describing image processing according to an embodiment.

With reference to FIGS. 8A, 8B, and 8C, a procedure for generating a detection frame according to an embodiment will be described. FIG. 8A illustrates an image 201 obtained by photographing, from behind, the vehicle 101 traveling in the left lane of the road surface 103 illustrated in FIG. 4A, for example. An example of a pixel block converted from the image 201 onto a real U map is illustrated on the right side of FIG. 8B. Note that an example of a pixel block converted onto a real U map is used here; however, the present embodiment is not limited as such, and a pixel block converted onto a U map may be used.

Here, based on the pixel information of the pixel block converted onto the real U map as illustrated on the right side of FIG. 8B, for example, the frame generating unit 33 generates frames in line units as illustrated on the left side of FIG. 8B. Specifically, the frame generating unit 33 generates a frame at each line, based on the disparity information and left and right edges of a label of the pixel block indicated by a rectangular frame illustrated on the right side of FIG. 8B. Furthermore, the frame generating unit 33 converts the disparity at the line position where the frequency integrated value of each line is maximum, into a distance. Furthermore, the frame generating unit 33 integrates the frames generated in line units, to generate a provisional frame [15] (see FIG. 8C).

Note that in FIG. 8B, the frames [1]' to [5]' generated in line units are illustrated so as to correspond to the respective pieces of pixel information of pixels [1] to [5] arbitrarily selected from the pixels forming the pixel block. This is for the sake of convenience in illustration, and in reality, the frame generating unit 33 generates frames corresponding to all of the pixels illustrated on the right side of FIG. 8B. Note that in FIG. 8B, [5] is a pixel corresponding to the back of the vehicle having a width, and therefore the generated frame of the line is also wide. Furthermore, on the left side of FIG. 8B, the generated frames [1]' to [5]' in line units are illustrated to have a constant height. This is because in the generated U map, the upper limit of the height from the road surface is set. For example, when the upper limit of the height is set to be 3 m when generating the U map, even if the actual height of the vehicle is greater than 3 m, the height of the generated frames will not exceed 3 m. In the present embodiment, when generating a detection frame that defines a search target region for detecting a body, it is not necessary for the detection frame to completely surround the entire vehicle that is the search target body.

<Image Processing>

Next, image processing according to an embodiment will be described with reference to the flowchart of FIG. 9 and FIGS. 10 to 13B. First, the image processing apparatus 30 generates a disparity image from a captured image captured by the stereo camera 10 (step S1). Next, the map generating unit 31 generates a V map, a U map, or a real U map based on the generated disparity image (step S2).

The detecting unit 32 detects a pixel block in the generated U map or real U map (step S3). The frame generating unit 33 generates a provisional frame based on the detected pixel block (step S4).

Figure 10:
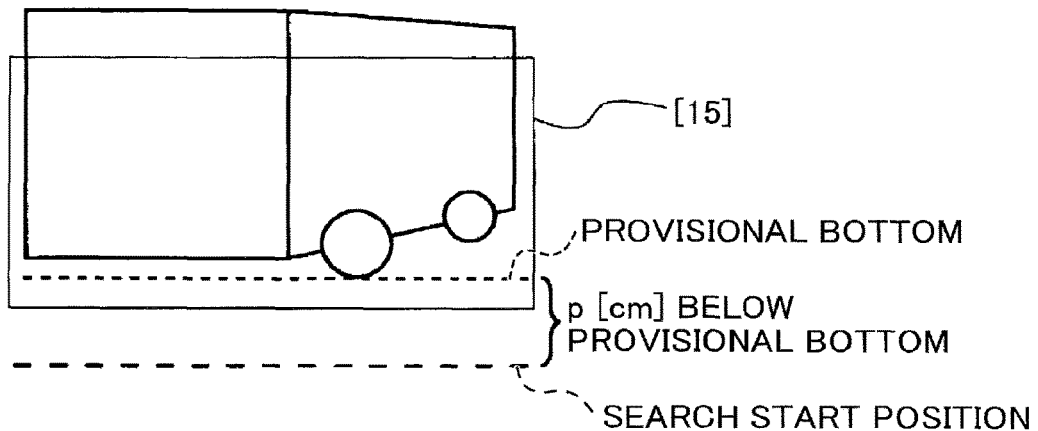
FIG. 10 is a diagram for describing a procedure of determining a search start position on the bottom side according to an embodiment.

The image processing apparatus 30 determines a provisional bottom of a body based on the generated provisional frame (step S5). For example, as illustrated in FIG. 10, a position lower than the bottom (bottom edge) of the provisional frame by a predetermined distance (for example, p [cm]) is set as a search start position for provisional bottom searching. This is because, for example, when the road surface estimated with the V map deviates upward from a predetermined position, it is desirable to start the searching from a position close to the bottom edge of the body as much as possible. The image processing apparatus 30 performs searching in the upward direction from the search start position, and for example, when there is disparity information of 4 counts or more on one line, this line is determined as the provisional bottom of the body. Note that it is needless to say that the unit [cm] is one example.

Figure 11:
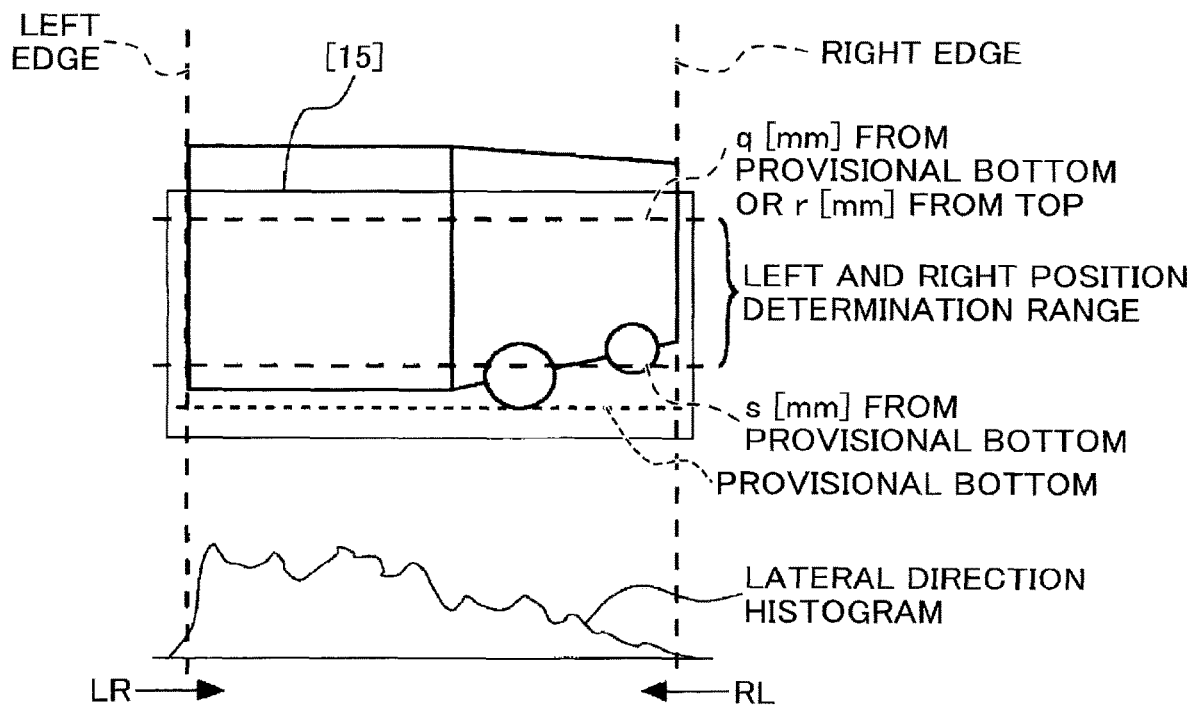
FIG. 11 is a diagram for describing a procedure of determining left and right positions of a body according to an embodiment.

Next, the edge portion determining unit 34 determines the left and right edges of the body (step S6). For example, as illustrated in FIG. 11, based on the frequency histogram of the disparity in the lateral direction, the edge portion determining unit 34 performs searching from the outside of the right and left edges of the provisional frame, from the right to the left as indicated by an arrow RL, and from the left to the right as indicated by an arrow LR. Next, when there are a predetermined number of continuous histograms having a frequency that is greater than or equal to a predetermined threshold value, the edge portion determining unit 34 determines the corresponding positions as the left and right edges of the body. Note that the edge portion determining unit 34 may process a histogram, whose frequency is less than the threshold value, as noise.

Note that in the above-described step S6, the edge portion determining unit 34 preferably sets the range to be searched for determining the left and right edges, to be a range extending between a position that is q [mm] from the provisional bottom or r [mm] from the top and a position that is s [mm] from the provisional bottom. This is for making it difficult to be affected by the disparity information on the road surface or the disparity information of other bodies, etc., located above the body.

Figure 12:
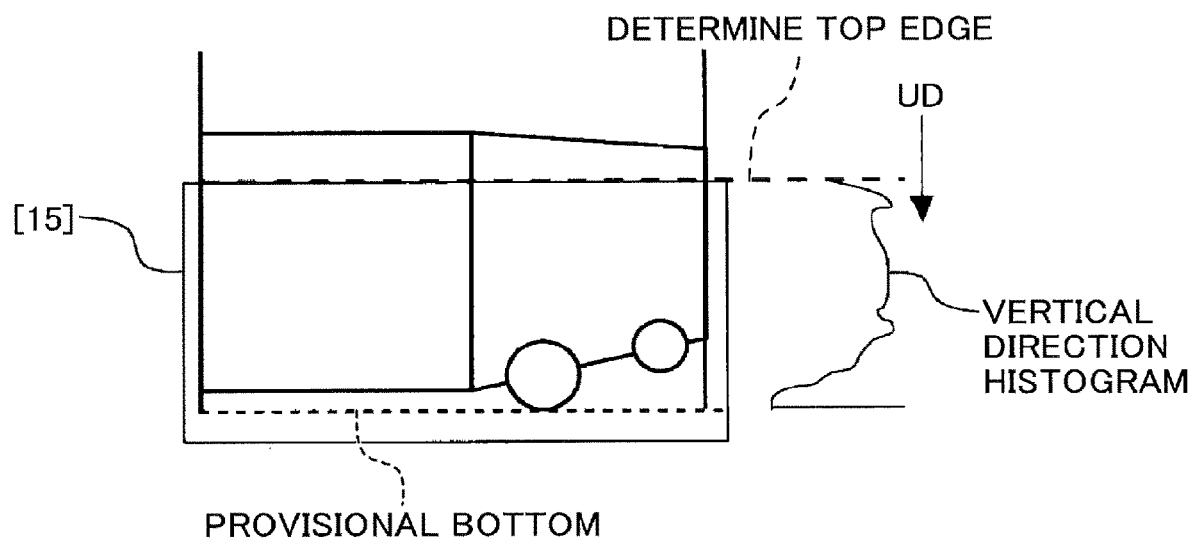
FIG. 12 is a diagram for describing a procedure of determining a top edge of a body according to an embodiment.

Next, the edge portion determining unit 34 determines the top edge of the body (step S7). For example, as illustrated in FIG. 12, the edge portion determining unit 34 performs the searching from the outside of the top edge of the provisional frame as indicated by an arrow UD, based on a frequency histogram of the disparity in the height direction. Next, when there are a predetermined number of continuous histograms having a frequency that is greater than or equal to a predetermined threshold value, the edge portion determining unit 34 determines the corresponding position as the top edge of the body. Note that the edge portion determining unit 34 may process a histogram, whose frequency is less than the threshold value, as noise. Furthermore, the threshold value may be varied depending on the shape of another body above the body or the roof, etc., of the body.

Figure 13A:
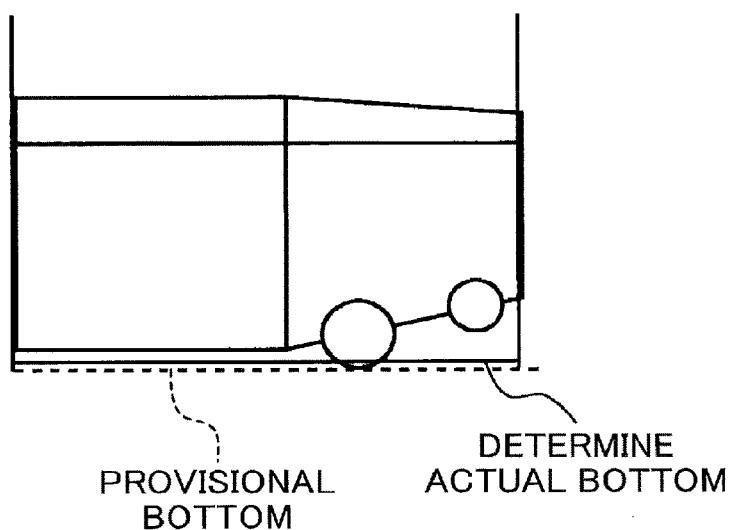
FIG. 13A is a diagram for describing a procedure for determining the bottom of a body according to an embodiment.
Figure 13B:
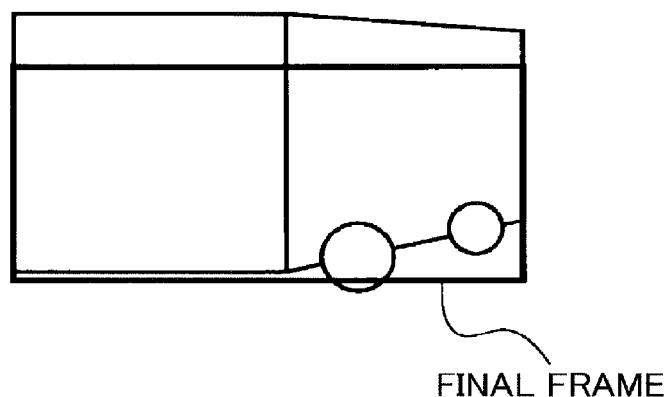
FIG. 13B is a diagram for describing a procedure for determining the bottom of a body according to an embodiment.

Finally, the edge portion determining unit 34 determines the actual bottom of the body (step S8). For example, as illustrated in FIGS. 13A and 13B, the edge portion determining unit 34 searches for disparities above and below the provisional bottom as a reference, and when a predetermined number of disparities of one line are detected, the edge portion determining unit 34 determines the corresponding position as the actual bottom of the body.

By executing the above-described image processing, it is possible to obtain desirable effects such as reducing unnecessary processing as much as possible, at the same time as increasing the speed of the body detection process and accurately recognizing the width, etc., of the body. Note that the above-described embodiment is image processing for obtaining the effects of the present invention, and the image processing for solving the problem of the present invention is not limited to the above-described embodiment. For example, image processing may be executed by exchanging the determination procedure of the left and right edges and the determination procedure of the top edge.

Furthermore, in the above-described embodiment, the procedure for determining the provisional bottom is performed in step S5; however, this procedure may be replaced with the procedure for determining the provisional top. In this case, the procedure for determining the top edge of step S7 may be replaced with the procedure for determining the bottom edge. In this case, the frequency histogram in the height direction is searched from the bottom to the top. Furthermore, in this case, the procedure for determining the bottom of step S8 may be replaced with the procedure for determining the top.

Note that in FIG. 11, the procedure of searching a frequency histogram in the lateral direction from the left and right of the provisional frame has been described as an example, and this is an effective procedure for increasing the speed of the detection process. However, the present invention is not limited as such, and a procedure of searching the frequency histogram in the lateral direction from the center to the left and right directions in the x axis direction may be adopted.

Note that the above-described embodiment is a preferred embodiment of the present invention, and various modifications and transformations can be made without departing from the scope of the present invention. For example, the image processing by the above-described image processing apparatus according to the embodiment can be executed using hardware, software, or a complex configuration including both.

Note that when executing image processing using software, it is possible to install a program recording an image processing sequence in a memory in a computer incorporated in exclusive-use hardware and execute the program. Alternatively, it is possible to install the above-described program in a general-purpose computer capable of executing various processes, and execute the program.

Furthermore, in the above-described embodiment, a stereo camera is described as a premise; however, the present invention is not limited as such. For example, a distance image may be generated by combining distance information of a laser radar, etc., and a disparity image, and the image processing apparatus according to the above-described embodiment may be applied to the generated distance image.

According to one embodiment of the present invention, it is possible to increase the speed of the process for detecting a body, and reduce the image processing time for surrounding the detected body with a detection frame.

The image processing apparatus, the device control system, the imaging apparatus, the image processing method, and the recording medium are not limited to the specific embodiments described in the detailed description, and variations and modifications may be made without departing from the spirit and scope of the present invention.

What is claimed is:

1. An image processing apparatus comprising:
processing circuitry configured to
generate a map formed of pixels that indicate information including left and right position information, distance information, and frequency values associated with the pixels;
detect a pixel block formed of a plurality of the pixels having a common feature amount in the map; and
generate a detection frame defining a search target region used for detecting a body from the distance information, based on the information indicated by the pixels forming the detected pixel block,
wherein the processing circuitry is further configured to:
search a distance image, which is formed of the pixels indicating the distance information, from an outer side toward a center of the distance image based on the detection frame, and to set a position, where a frequency of the distance information is greater than or equal to a predetermined threshold value, as an edge portion of the body, and
search the distance image from left and right sides toward a center of the distance image in an x axis direction based on the detection frame, and sets positions, where a frequency of the distance information in the x axis direction is greater than or equal to a predetermined threshold value, as left and right edges of the body.

2. The image processing apparatus according to claim 1, wherein the processing circuitry searches the distance image from top and bottom sides toward a center of the distance image in a y axis direction based on the detection frame, and sets positions, where a frequency of the distance information in the y axis direction is greater than or equal to a predetermined threshold value, as top and bottom edges of the body.

3. The image processing apparatus according to claim 1, wherein the processing circuitry sets a position of starting to search the distance image, at a position that is away from an outer side of the detection frame by a predetermined distance.

4. The image processing apparatus according to claim 1, wherein the processing circuitry searches a predetermined range of the distance image in a y axis direction, from left and right sides toward a center of the distance image in the x axis direction, based on the detection frame.

5. The image processing apparatus according to claim 1, wherein the processing circuitry changes a resolution of the distance image to be searched, based on the distance information indicated by the pixels forming the detected pixel block.

6. An imaging apparatus comprising:
two imagers; and
the image processing apparatus according to claim 1, wherein
the map is generated from captured images captured by the two imagers.

7. A device control system comprising:
processing circuitry configured to
generate a map formed of pixels that indicate information including left and right position information, distance information, and frequency values associated with the pixels;
detect a pixel block formed of a plurality of the pixels having a common feature amount in the map;
generate a detection frame defining a search target region used for detecting a body from the distance information, based on the information indicated by the pixels forming the detected pixel block;
detect the body based on the generated detection frame; and
control a predetermined device based on a result of the detection of the body,
wherein the processing circuitry is further configured to:
search a distance image, which is formed of the pixels indicating the distance information, from an outer side toward a center of the distance image based on the detection frame, and to set a position, where a frequency of the distance information is greater than or equal to a predetermined threshold value, as an edge portion of the body, and
search the distance image from left and right sides toward a center of the distance, image in an x axis direction based on the detection frame, and sets positions, where a frequency of the distance information in the x axis direction is greater than or equal to a predetermined threshold value, as left and right edges of the body.

8. The device control system according to claim 7, wherein the processing circuitry searches the distance image from top and bottom sides toward a center of the distance image in a y axis direction based on the detection frame, and sets positions, where a frequency of the distance information in they axis direction is greater than or equal to a predetermined threshold value, as top and bottom edges of the body.

9. The device control system according to claim 7, wherein the processing circuitry sets a position of starting to search the distance image, at a position that is away from an outer side of the detection frame by a predetermined distance.

10. The device control system according to claim 7, wherein the processing circuitry searches a predetermined range of the distance image in a y axis direction, from left and right sides toward a center of the distance image in the x axis direction, based on the detection frame.

11. The device control system according to claim 7, wherein the processing circuitry changes a resolution of the distance image to be searched, based on the distance information indicated by the pixels forming the detected pixel block.

12. A non-transitory computer-readable recording medium storing program at causes a computer to execute a process, the process comprising:
generating a map formed of pixels that indicate information including left and right position information, distance information, and frequency values associated with the pixels;
detecting a pixel block formed of a plurality of the pixels having a common feature amount in the map;
generating a detection frame defining a search target region used for detecting a body from the distance information, based on the information indicated by the pixels forming the detected pixel block;
searching a distance image, which is formed of the pixels indicating the distance information, from an outer side toward a center of the distance image based on the detection frame, and to set a position, where a frequency of the distance information is greater than or equal to a predetermined threshold value, as an edge portion of the body; and
searching the distance image from left and right sides toward a center of the distance image in an x axis direction based on the detection frame and sets positions, where a frequency of the distance information in the x axis direction is greater than or equal to a predetermined threshold value, as left and right edges of the body.

13. The non-transitory computer-readable recording medium according to claim 12, wherein the process further comprises:
searching the distance image from top and bottom sides toward a center of the distance image in a y axis direction based on the detection frame, and sets positions, where a frequency of the distance information in they axis direction is greater than or equal to a predetermined threshold value, as top and bottom edges of the body.

14. The non-transitory computer-readable recording medium according to claim 12, wherein the process further comprises:
setting a position of starting to search the distance image, at a position that is away from an outer side of the detection frame by a predetermined distance.

15. The non-transitory computer-readable recording medium according to claim 12, wherein the process further comprises:
searching a predetermined range of the distance image in a y axis direction, from left and right sides toward a center of the distance image in the x axis direction, based on the detection frame.

16. The non-transitory computer-readable recording medium according to claim 12, wherein the process further comprises:
changing a resolution of the distance image to be searched, based on the distance information indicated by the pixels forming the detected pixel block.

* * * * *